(12) United States Patent
Dietze et al.

(10) Patent No.: US 11,835,384 B2
(45) Date of Patent: Dec. 5, 2023

(54) OPTOELECTRONIC MEASURING DEVICE FOR MEASURING AN INTENSITY OF ELECTROMAGNETIC RADIATION

(71) Applicant: OSRAM Opto Semiconductors GmbH, Regensburg (DE)

(72) Inventors: Daniel Dietze, Regensburg (DE); Wolfgang Zinkl, Tegernheim (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 17/612,916

(22) PCT Filed: May 12, 2020

(86) PCT No.: PCT/EP2020/063181
§ 371 (c)(1),
(2) Date: Nov. 19, 2021

(87) PCT Pub. No.: WO2020/234046
PCT Pub. Date: Nov. 26, 2020

(65) Prior Publication Data
US 2022/0228909 A1    Jul. 21, 2022

(30) Foreign Application Priority Data

May 21, 2019   (DE) .................. 10 2019 207 404.9

(51) Int. Cl.
*G01J 1/42*    (2006.01)
*G01J 1/04*    (2006.01)
(Continued)

(52) U.S. Cl.
CPC .......... *G01J 1/4228* (2013.01); *G01J 1/0474* (2013.01); *G01J 1/0488* (2013.01); *G01J 1/4204* (2013.01);
(Continued)

(58) Field of Classification Search
CPC ...... G01J 1/4228; G01J 1/0474; G01J 1/0488; G01J 1/4204; G01J 3/465; G01J 2003/1226
See application file for complete search history.

(56) References Cited

U.S. PATENT DOCUMENTS 6,302,953 B1   10/2001 Saikatsu et al.
2008/0111204 A1*  5/2008 Yun .................. H01L 27/14685
257/E31.127
(Continued)

FOREIGN PATENT DOCUMENTS

WO        2008097705 A1    8/2008

*Primary Examiner* — Jennifer D Bennett
(74) *Attorney, Agent, or Firm* — Slater Matsil, LLP

(57) ABSTRACT

In an embodiment, an optoelectronic measuring device includes a first detector configured to provide a first detector signal, a second detector configured to provide a second detector signal, wherein each of the first detector and the second detector is configured to detect electromagnetic radiation, a signal difference determiner configured to generate a difference signal by subtracting the second detector signal from the first detector signal and a spectral filter arranged in a beam path upstream of the second detector, wherein the spectral filter is configured to filter the electromagnetic radiation before detection by the second detector, wherein the optoelectronic measuring device is configured to measure an intensity of the electromagnetic radiation impinging on the optoelectronic measuring device.

13 Claims, 6 Drawing Sheets

(51) Int. Cl.
*G01J 3/46* (2006.01)
*G01J 3/12* (2006.01)
(52) U.S. Cl.
CPC ....... *G01J 3/465* (2013.01); *G01J 2003/1226* (2013.01)

(56) References Cited

U.S. PATENT DOCUMENTS

| | | | |
|---|---|---|---|
| 2009/0321640 | A1 | 12/2009 | Onogi |
| 2010/0045963 | A1* | 2/2010 | Yamaguchi .............. G01C 3/08 356/4.01 |
| 2010/0282953 | A1* | 11/2010 | Tam .......................... G01J 1/32 356/402 |
| 2012/0074322 | A1 | 3/2012 | Skurnik |
| 2012/0170284 | A1* | 7/2012 | Shedletsky ........... G01J 1/0407 362/355 |
| 2016/0141322 | A1* | 5/2016 | Gokingco ............. G01J 1/0433 257/432 |
| 2018/0227550 | A1* | 8/2018 | Fossum .................. H04N 9/045 |

* cited by examiner

OPTOELECTRONIC MEASURING DEVICE FOR MEASURING AN INTENSITY OF ELECTROMAGNETIC RADIATION

This patent application is a national phase filing under section 371 of PCT/EP2020/063181, filed May 12, 2020, which claims the priority of German patent application 102019207404.9, filed May 21, 2019, each of which is incorporated herein by reference in its entirety.

TECHNICAL FIELD

The invention relates to an optoelectronic measuring device for measuring the intensity of electromagnetic radiation impinging on the measuring device, and to an associated method.

BACKGROUND

Such an optoelectronic measuring device can comprise a plurality of detectors, the detector signals of which are evaluated. In particular, the detector signals of two detectors can be subtracted from one another in order to generate a difference signal. For example, a constant measurement error (also called offset) present in both detector signals can be eliminated as a result.

SUMMARY

Embodiments provide an optoelectronic measuring device for measuring the intensity of electromagnetic radiation impinging on the optoelectronic measuring device, and a corresponding method for measuring an intensity of electromagnetic radiation.

Such a device comprises a first detector, which detects the electromagnetic radiation and provides a first detector signal dependent thereon, and a second detector, which likewise detects the electromagnetic radiation and provides a second detector signal dependent thereon. The measuring device furthermore comprises a signal difference determiner, which subtracts the second detector signal from the first detector signal and thereby generates a difference signal. A spectral filter is arranged in a beam path upstream of the second detector and filters the electromagnetic radiation before detection by the second detector.

A corresponding measuring method accordingly comprises the step of detecting S1 the electromagnetic radiation by means of a first detector with provision of a first detector signal dependent on the intensity of the electromagnetic radiation, detecting S2 the electromagnetic radiation by means of a second detector with provision of a second detector signal dependent on the intensity of the electromagnetic radiation, wherein the electromagnetic radiation is filtered by means of a spectral filter before detection by the second detector, and generating S3 a difference signal between first detector signal and second detector signal by subtracting the second detector signal from the first detector signal.

As a result, firstly a constant measurement error (also called offset) present in both detector signals can be eliminated. By way of example, detectors (e.g. comprising or consisting of a silicon photodiode) can output detector signals with a temperature-dependent offset, also called dark current, which can be eliminated by the subtraction described above.

At the same time a spectral sensitivity of the measuring device is influenced by the spectral filter. Detectors have a sensitive spectral range. This is the wavelength range in which radiation is detected, A detector can have a wavelength-dependent sensitivity, also called spectral sensitivity, such that different wavelengths of the same intensity generate detector signals, e.g. voltages or currents, of different magnitudes.

By way of example, if the electromagnetic radiation is of high intensity in a spectral range whose intensity is greatly reduced by the spectral filter, a high first detector signal can be provided, and a small second detector signal to be subtracted therefrom, this resulting in a high difference signal. By contrast, if the electromagnetic radiation is of high intensity in a spectral range whose intensity is hardly reduced by the spectral filter, a high first detector signal can be provided, and a likewise high second detector signal to be subtracted therefrom. This in turn results in a low difference signal. As a result, therefore, on account of a low absorption of the spectral filter in one specific spectral range, the spectral sensitivity of the difference signal for the electromagnetic radiation in precisely this spectral range can be low, whereas as a result of a high absorption of the spectral filter in another spectral range, the spectral sensitivity of the difference signal for the electromagnetic radiation in precisely this other spectral range is high.

The optoelectronic measuring device preferably comprises a signal output, at which the difference signal described above is output. This can be effected in method step S3.

Preferably, the first detector, at least in a portion of its sensitive spectral range, has an identical type of spectral sensitivity in comparison with the second detector. By way of example, the first detector, at least in a portion of its sensitive spectral range, apart from manufacturing tolerances, can have an identical spectral sensitivity in comparison with the second detector.

In particular, the first detector is structurally identical to the second detector. In particular, the two detectors can be of the same type and differ only in terms of manufacturing tolerances.

A spectral sensitivity of the first and second detectors that is identical apart from manufacturing tolerances can for example also be achieved in the case of detectors of different types by virtue of at least one of the detectors having an electronic circuit that provides a spectral sensitivity identical to that of the other detector, for example by said circuit increasing or reducing the corresponding detector signal wavelength-dependently or wavelength-independently.

In the case of an identical spectral sensitivity of both detectors, electromagnetic radiation from a spectral range in which the spectral filter does not filter generates first and second detector signals of identical magnitude, such that the resulting measurement signal is zero, apart from measurement errors. By contrast, electromagnetic radiation in a spectral range whose intensity is reduced by the spectral filter generates a first detector signal that is greater than the second detector signal, such that a positive difference signal results. Accordingly, the spectral range whose intensity is reduced by the spectral filter can define the spectral sensitivity of the difference signal for the input radiation.

Preferably, the spectral filter is not arranged in the beam path upstream of the first detector. The electromagnetic radiation is then not filtered by the spectral filter before detection by the first detector.

The first detector or the second detector or ideally both the first and the second detectors can comprise or consist of a silicon photodiode.

The spectral sensitivity of silicon photodiodes is not adapted to the spectral sensitivity of the human eye. Such an adaptation can be effected by the spectral filter described above.

Spectral filters have a wavelength-dependent intensity attenuation, called spectral intensity attenuation hereinafter. The spectral sensitivity of the second detector in combination with the spectral filter for a specific wavelength is accordingly equal to the spectral sensitivity of the second detector without the spectral filter for said wavelength multiplied by the factor one minus the spectral intensity attenuation of the spectral filter for said wavelength.

The spectral filter is preferably intensity attenuating to the extent of at least 50% or to the extent of at least 75% or even to the extent of at least 90% in a green spectral range, that is to say that at a wavelength in a green spectral range, the spectral intensity attenuation of the spectral filter is at least 50% or at least 75% or even at least 90%. By way of example, the spectral filter can be intensity attenuating to the extent of at least 50% or to the extent of at least 75% or even to the extent of at least 90% in a spectral range of 530 nm to 580 nm inclusive, that is to say that at any wavelength in the spectral range mentioned, the spectral intensity attenuation of the spectral filter is at least 50% or at least 75% or even at least 90%.

Furthermore, the spectral filter can be intensity attenuating to the extent of at most 30% or at most 20% or at most 10% in a spectral range of 200 nm to 450 nm inclusive, that is to say that at any wavelength in the spectral range mentioned, the spectral intensity attenuation of the spectral filter is at most 30% or at most 20% or at most 10%.

Furthermore, the spectral filter can be intensity attenuating to the extent of at most 30% or at most 20% or at most 10% in a spectral range of 670 nm to 1200 nm inclusive, that is to say that at any wavelength in the spectral range mentioned, the spectral intensity attenuation of the spectral filter is at most 30% or at most 20% or at most 10%.

Preferably, the spectral intensity attenuation has a maximum in a wavelength range of 550 nm to 560 nm inclusive. The maximum can be a global maximum relative to the spectral range of 530 nm to 580 nm inclusive or preferably 200 nm to 1200 nm inclusive.

By way of example, an adaptation to the spectral sensitivity of the human eye can thereby be effected.

The standard Commission Internationale de l'Eclairage (CIE) 018.2-1983 describes the spectral sensitivity of the human eye. Preferably, taking the spectral sensitivity of the first and second detectors into consideration, a spectral filter is used whose spectral intensity attenuation is such that the mean square deviation between a spectral sensitivity normalized to one of the difference signal for the electromagnetic radiation and the spectral sensitivity (which varies between zero and 1 in accordance with CIE 018.2-1983) of the human eye in accordance with CIE 018.2-1983 is less than the mean square deviation between the spectral sensitivity normalized to 1 of the first detector signal for the electromagnetic radiation and the spectral sensitivity of the human eye in accordance with CIE 018.2-1983 and/or is less than the mean square deviation between the spectral sensitivity normalized to 1 of the second detector signal for the electromagnetic radiation and the spectral sensitivity of the human eye in accordance with CIE 018.2-1983.

The spectral filter can be a multilayer interference filter. The latter can comprise a plurality of dielectric and/or metallic layers. Furthermore, it can be a bulk filter, i.e. a filter in which a filter material is embedded in an injection molding material or in a potting material. Such a bulk filter advantageously exhibits a significantly lower angle dependence than a multilayer interference filter.

The spectral filter can particularly preferably comprise or consist of a spin-coated filter material. Such a filter likewise advantageously exhibits a significantly lower angle dependence than a multilayer interference filter. Spin-coated filter materials can easily be spin-coated onto a silicon substrate or onto a silicon photodiode and exhibit a low dependence on the angle of incidence of the electromagnetic radiation.

By fitting the spectral filter in a beam path upstream of the second detector, using a simple spectral filter (in particular a spin-coated filter material) it is possible to generate a spectral sensitivity of the difference signal which otherwise (e.g. using only one detector and fitting the spectral filter in a beam path upstream of this detector) would be made possible only with more complex filter systems. In particular, by means of a notch filter, which filters out only frequencies within a specific spectral range, this can bring about a high spectral sensitivity of the difference signal precisely in said spectral range.

The spectral filter (in particular a bulk filter or a spin-coated spectral filter) can comprise or consist of a filter material selected from the following group of filter materials:

the dye "Procion® Red MX-5B", which is commercially available from Sigma Aldrich® and has the chemical formula $C_{19}H_{10}Cl_2N_6Na_2O_7S_2$;

a chemical compound of the maleimide type, in particular the commercially available dye QXL® 570 C2 maleimide;

crystal violet;

a cyanine dye, in particular Cy3;

gold nanoparticles;

colloidal quantum dots.

In accordance with one particularly preferred embodiment, the spectral filter comprises only one filter material, also called dye, e.g. only one Cy3 filter material or only the dye "Procion® Red MX-5B".

The spectral filter can furthermore comprise a fluorescence quenching medium, which suppresses a fluorescence of a filter material.

As described above, both the first detector and the second detector are arranged to detect the electromagnetic radiation, although the spectral filter is arranged in the beam path upstream of the second detector.

For this purpose, by way of example, the first detector and the second detector can be arranged relative to one another in such a way that a distance between a detection surface of the first detector and a detection surface of the second detector is less than or equal to 2 cm, preferably less than or equal to 5 mm and particularly preferably less than or equal to 1 mm or even less than or equal to 100 μm. In this case, the term detection surface denotes a surface of the respective detector, wherein the detector is configured to detect the electromagnetic radiation impinging on the detection surface and to provide a detector signal dependent thereon, for example dependent on the radiation intensity, and is configured not to detect electromagnetic radiation impinging on the detector outside the detection surface.

Alternatively or additionally, the first detector and the second detector can be arranged relative to one another and configured in such a way that all points of the first and second detection surfaces are situated at a distance from one another of less than or equal to 1.5 cm or preferably less than or equal to 3 mm or particularly preferably less than or equal to 500 μm.

Alternatively or additionally, the first detector and the second detector can be arranged relative to one another in such a way that a main detection direction of the first detector and a main detection direction of the second detector are at an angle of at most 45 degrees or preferably at most 30 degrees or particularly preferably at most 15 degrees with respect to one another. In this case, the term main detection direction denotes a direction in which the detector has a maximum detection efficiency for the electromagnetic radiation.

In accordance with one particularly advantageous embodiment, the first detector and the second detector are arranged relative to one another in such a way that a distance between a detection surface of the first detector and a detection surface of the second detector is less than or equal to 2 cm, preferably less than or equal to 5 mm and particularly preferably less than or equal to 1 mm or even less than or equal to 100 μm, and a main detection direction of the first detector and a main detection direction of the second detector are at an angle of at most 30 degrees with respect to one another.

In accordance with one likewise particularly advantageous embodiment, the first detector and the second detector are arranged relative to one another and configured in such a way that all points of the first and second detection surfaces are situated at a distance from one another of less than or equal to 1.5 cm or better less than or equal to 3 mm or better less than or equal to 500 μm, and are arranged relative to one another in such a way that a main detection direction of the first detector and a main detection direction of the second detector are at an angle of at most 30 degrees with respect to one another.

As an alternative or in addition to one or more of the possibilities described above for arranging the detectors in such a way that both detectors detect the electromagnetic radiation, the optoelectronic measuring device can also comprise an optical radiation distributing means configured and arranged to distribute the electromagnetic radiation impinging on the optoelectronic measuring device between the first detector and the second detector. In particular, the radiation distributing means can be arranged in a beam path upstream of the first detector and the second detector. The radiation distributing means can comprise an optical waveguide, for example, which guides the electromagnetic radiation to the first detector and the second detector. Alternatively or additionally, the radiation distributing means can comprise a diffusing element arranged in a beam path upstream of the first detector and the second detector.

Embodiments relate to a display device comprising the optoelectronic measuring device described above, wherein the optoelectronic measuring device is arranged for example for detecting an ambient brightness. The display device preferably comprises a control unit configured to control a display brightness of a display element of the display device depending on the difference signal. It can be the display device of a telephone, tablet or of a smartphone or of a motor vehicle. By way of example, the control unit can be configured to increase the display brightness as the difference signal increases, in order that the display element becomes brighter as the ambient brightness increases.

Embodiments relate to a motor vehicle comprising the optoelectronic measuring device described above, wherein the optoelectronic measuring device is arranged for example for detecting an ambient brightness. The motor vehicle preferably comprises a control unit configured to control a brightness depending on the difference signal. This can be a display brightness of a display device of the motor vehicle. Alternatively or additionally, the control unit can be configured to control a headlight or a position luminaire of the motor vehicle depending on the difference signal. By way of example, the control unit can be configured to switch off the headlight or the position luminaire in the case of a high difference signal, in order that the headlight or the position luminaire is not luminous when there is high ambient brightness.

BRIEF DESCRIPTION OF THE DRAWINGS

Various exemplary embodiments of the solution according to the invention are explained in greater detail below with reference to the drawings.

In the figures

DETAILED DESCRIPTION OF ILLUSTRATIVE EMBODIMENTS

Figure 1:
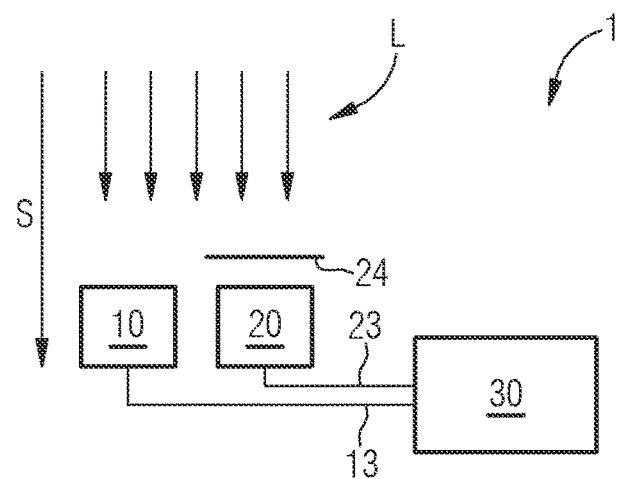
FIG. 1 shows an optoelectronic measuring device in accordance with a first exemplary embodiment.

The optoelectronic measuring device 1 in accordance with the first exemplary embodiment illustrated in FIG. 1 comprises a first detector 10 and a second detector 20. These detectors are both configured to detect electromagnetic radiation L and in the process each outputs a radiation-intensity-dependent detector signal. In this case, the first detector signal of the first detector 10 is transmitted to a signal difference determiner 30 via a first data line 13 and a second detector signal of the second detector 20 is transmitted to the signal difference determiner 30 via a second data line 23. As an alternative thereto, the detector signals can also be transmitted by radio or by means of light signals, for example. The signal difference determiner 30 generates a difference signal by subtracting the second detector signal from the first detector signal. Both detectors 10, 20 detect the electromagnetic radiation L, as mentioned, although a spectral filter 24 is arranged in a beam path S upstream of the second detector 20, such that the electromagnetic radiation is filtered by means of the spectral filter 24 before detection by the second detector 20. In the present exemplary embodiment, the spectral filter 24 is not arranged in the beam path upstream of the first detector 10, such that in the present exemplary embodiment, the electromagnetic radiation S is not filtered by the spectral filter 24 before detection by the first detector 10.

Figure 2:
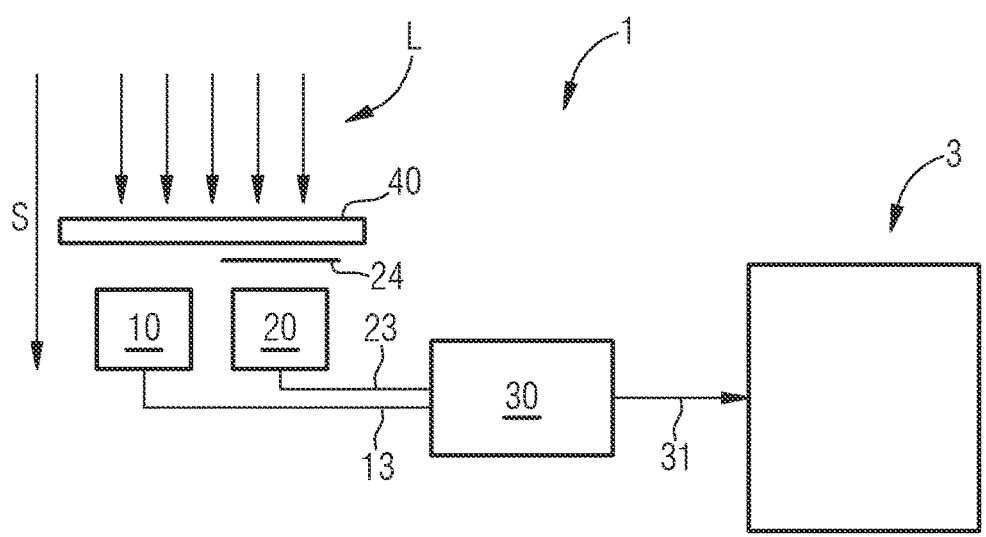
FIG. 2 shows an optoelectronic measuring device in accordance with a second exemplary embodiment.

The optoelectronic measuring device 1 in accordance with a second exemplary embodiment as illustrated in FIG. 2 is constructed analogously to that of the first exemplary embodiment, but comprises further component parts. It additionally comprises a signal output 31, at which the difference signal is output and can be tapped off. This can be done in an electrically conductive manner or by radio or optionally by means of light signals. A control unit 3 is connected to the signal output 31, which control unit suitably processes the difference signal and is not part of the measuring device 1. The control unit 3 can be an interface of a personal computer, for example, by means of which the difference signal is evaluated.

In the case of the measuring device 1 indicated in FIG. 2, a radiation distributing means 40 is furthermore arranged in the beam path S upstream of the first detector 10 and the second detector 20. Said means is a diffusing plate, which diffusely scatters the incident electromagnetic radiation L, such that both the first detector 10 and the second detector 20 detect the electromagnetic radiation L.

Instead of or in addition to the diffusing plate, by way of example, an optical wavelength could also be used in order to guide the electromagnetic radiation L to the first and second detectors 10, 20.

Figure 3:
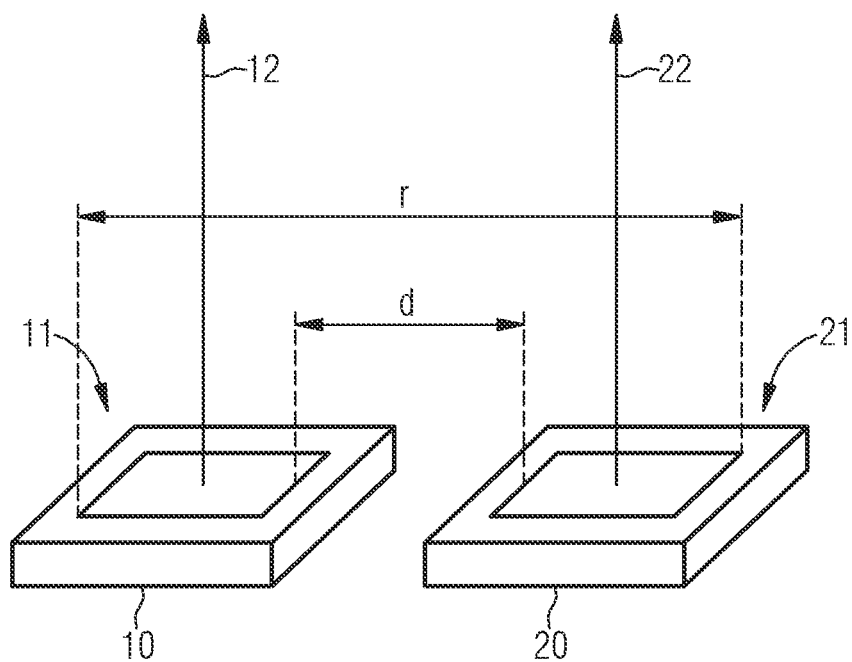
FIG. 3 shows a distance and an orientation of the detectors of the optoelectronic measuring device in accordance with the second exemplary embodiment.

FIG. 3 schematically illustrates the distance and the orientation of the two detectors 10, 20 of the second exemplary embodiment with respect to one another. A distance d between the detection surfaces 11, 21 of the two detectors is just 1 mm and the detection surfaces 11, 21 are at the same time so small that all points of the first and second detection surfaces 11, 21 are situated at a distance r from one another of less than or equal to 3 mm, such that both the first detector 10 and the second detector 20 detect the electromagnetic radiation L. Furthermore, the first detector and the second detector are arranged relative to one another in such a way that a main detection direction 12 of the first detector 10 and a main detection direction 22 of the second detector 20—apart from manufacturing tolerances—are parallel, such that both the first detector 10 and the second detector 20 detect the electromagnetic radiation L.

Figure 4:
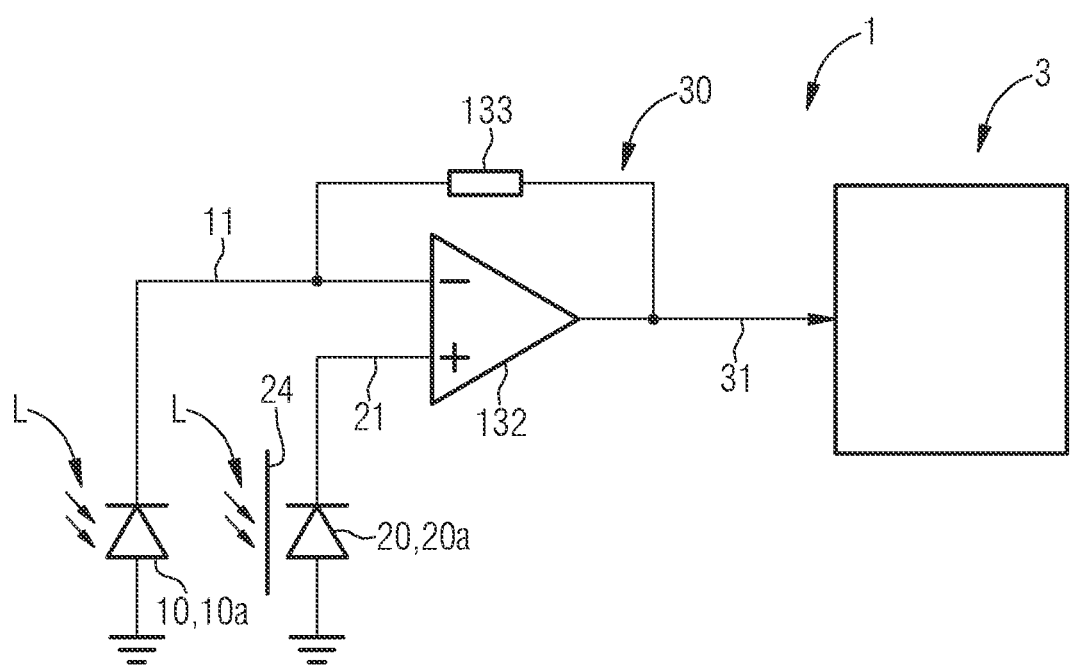
FIG. 4 shows an optoelectronic measuring device in accordance with a third exemplary embodiment.

The optoelectronic measuring device 1 in accordance with a third exemplary embodiment as illustrated in FIG. 4 is constructed analogously to the optoelectronic measuring device 1 in accordance with the second exemplary embodiment. In the present case, the first detector 10 consists of a silicon photodiode 10a and the second detector 20 consists of a silicon photodiode 20a structurally identical thereto. The signal difference determiner 30 comprises an operational amplifier 132 connected with the aid of the resistor 133 in such a way that it regulates a voltage present at the output 31 such that as a result the difference voltage at its two inputs (designated by + and − in FIG. 4) is regulated to zero. The radiation distributing means 40 is not illustrated in the third exemplary embodiment of an optoelectronic measuring device 1 but it can be present. Furthermore, the silicon photodiodes $10_a$, $10_b$ can be arranged as described in association with FIG. 3.

Figure 5A:
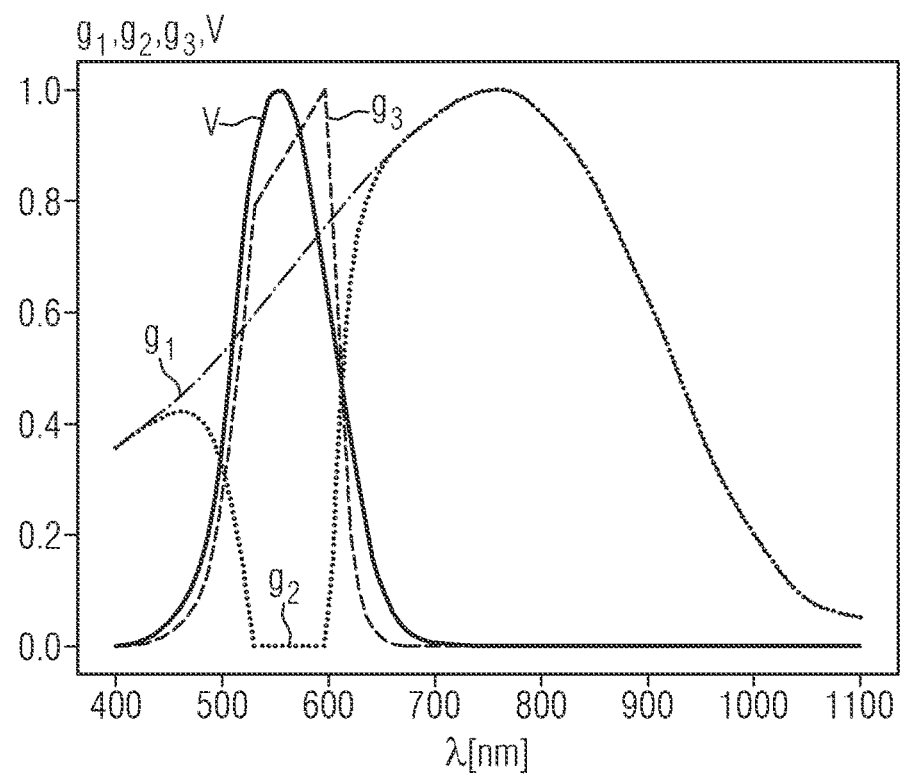
FIGS. 5a-5e show spectral sensitivities in association with the optoelectronic measuring device in accordance with the third exemplary embodiment.

FIG. 5a illustrates the spectral sensitivity $g_1(\lambda)$ of the first silicon photodiode 10a of the third exemplary embodiment normalized to one. The second silicon photodiode 10b structurally identical thereto has the same spectral sensitivity in principle. However, the spectral filter 24 is disposed upstream of said silicon photodiode and brings about a wavelength-dependent intensity attenuation, also called spectral intensity attenuation $a(\lambda)$, of the electromagnetic radiation L. In the present case, said spectral filter is a spectral filter 24 consisting of the commercially available filter material QXL® 570 C2 maleimide. The spectral sensitivity $g_2(\lambda)$—likewise illustrated as normalized to one in FIG. 5a—of the second silicon photodiode 20a in combination with the spectral filter 24 is therefore equal to a spectral sensitivity of the second silicon photodiode 20a without spectral filter 24 multiplied by the factor 1−$a(\lambda)$. The aforementioned spectral sensitivity of the second silicon photodiode 20a without spectral filter is not directly illustrated in FIG. 5a, but corresponds to the illustrated spectral sensitivity $g_1(\lambda)$ of the first silicon photodiode 10a owing to the two silicon photodiodes 10a, 20a being structurally identical. The spectral sensitivity $g_3(\lambda)=g_1(\lambda)-g_2(\lambda)$ of the difference signal which is obtained by subtracting the second detector signal from the first detector signal and is output at the signal output 31 is likewise illustrated as normalized to one in FIG. 5a. It is particularly high for wavelengths around 555 nm, that is to say in a range in which the spectral filter attenuates the intensity of the electromagnetic radiation L greatly or even to the extent of boo percent.

Figure 5B:
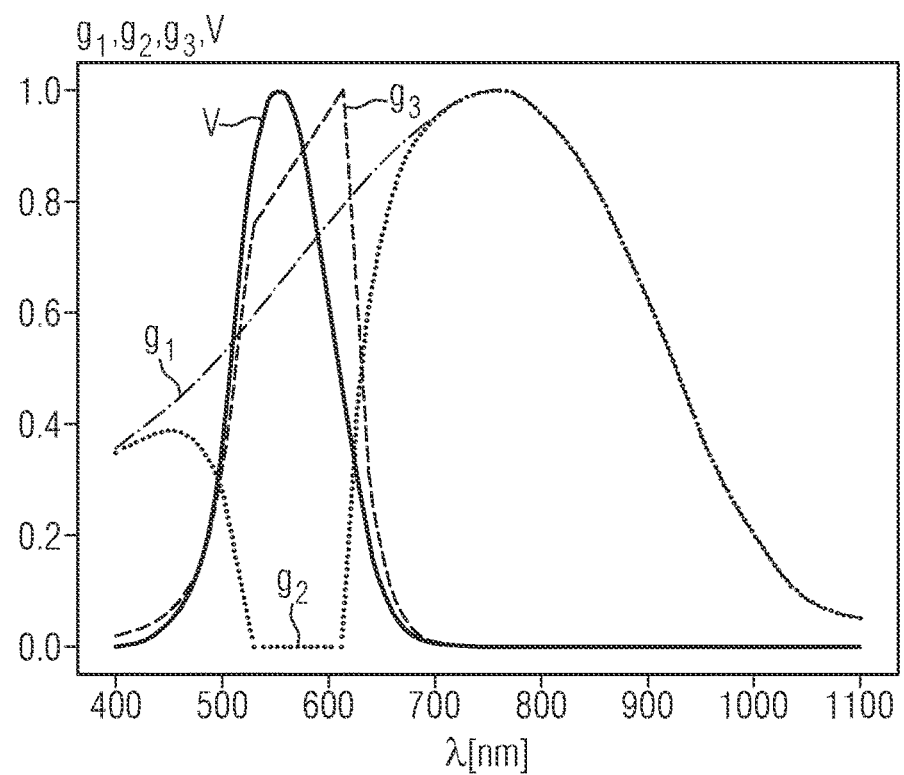
Figure 5C:
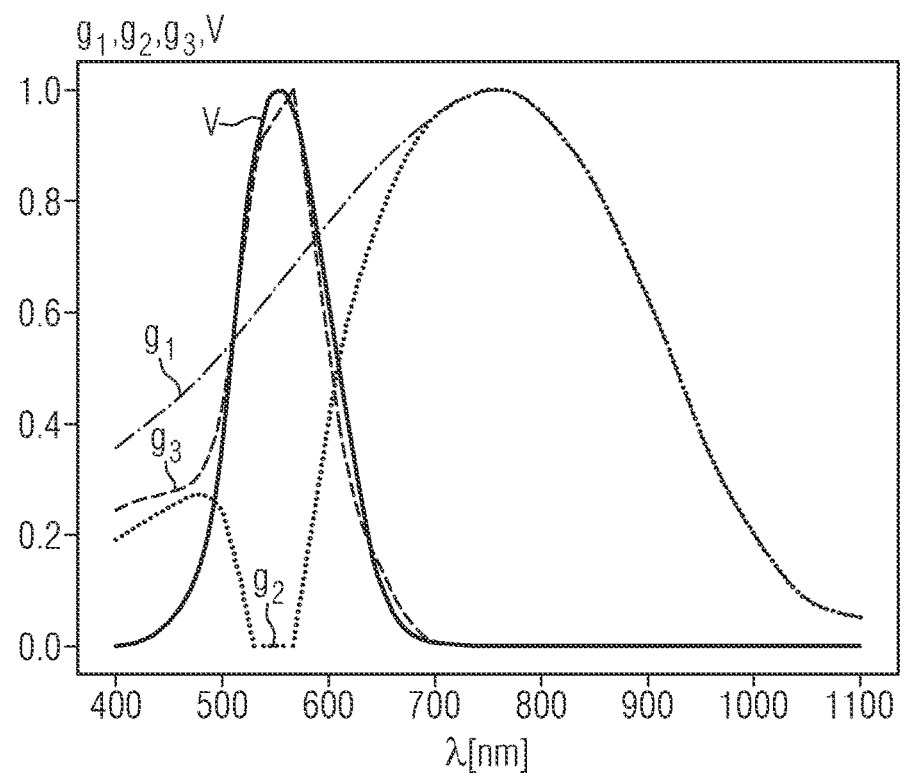
Figure 5D:
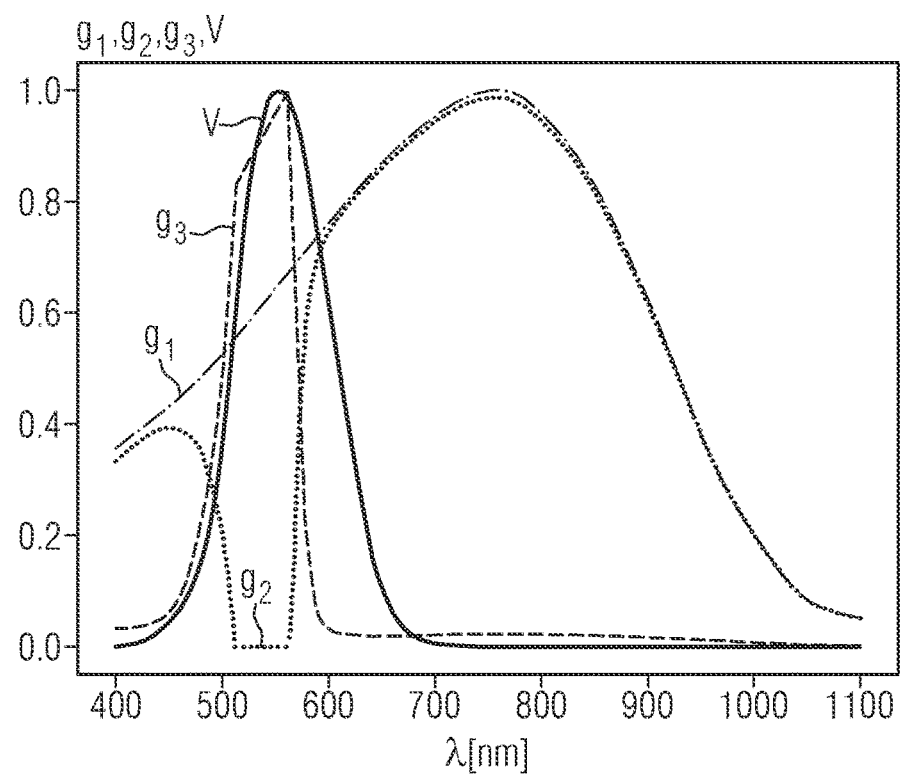
Figure 5E:
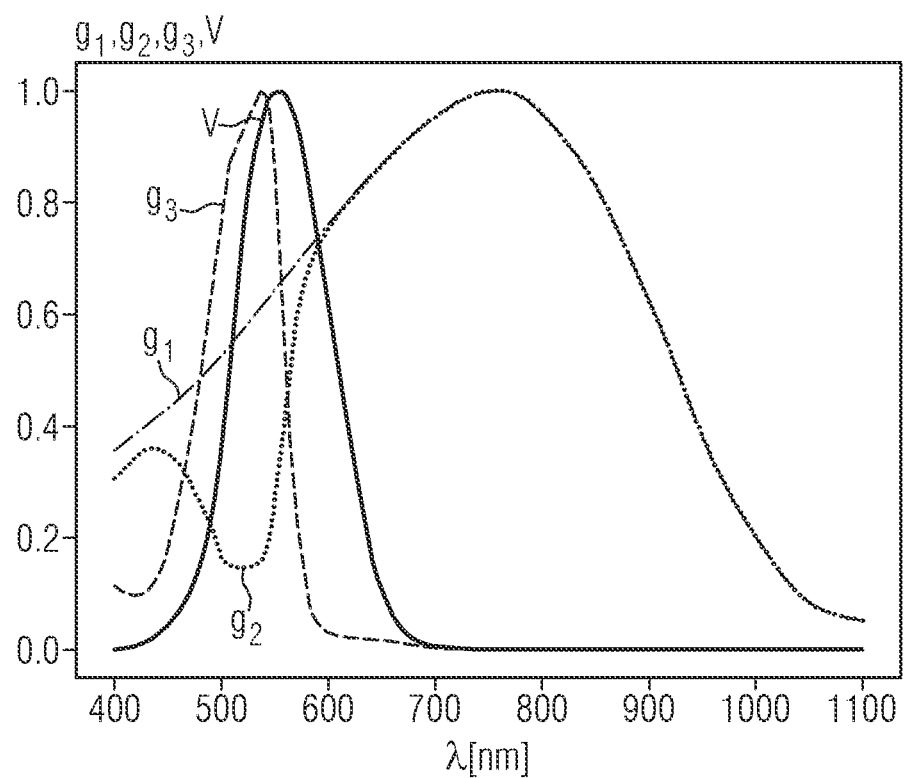

FIGS. 5b, 5c, 5d and 5e show, with reference to exemplary embodiment 3 in FIG. 4, corresponding spectral sensitivities $g_1(\lambda)$, $g_2(\lambda)$ and $g_3(\lambda)$ for other filter materials, in each case in combination with the silicon photodiodes 10a, 20a of exemplary embodiment 3. In these figures:

FIG. 5a: concerns, as mentioned, a spectral filter consisting of the commercially available filter material QXL® 570 C2 maleimide;

FIG. 5b: concerns a spectral filter consisting of a dye of the crystal violet type, FIG. 5c: concerns a spectral filter consisting of nanoparticles of gold having a typical diameter of 80 nm, said nanoparticles being embedded in a matrix, FIG. 5d: concerns a spectral filter consisting of a cyanine dye of the Cy3 type, and FIG. 5e: concerns a spectral filter consisting of the commercially available filter material Procion® Red MX-5B.

The filter materials mentioned above can be spin-coated in particular onto a filter carrier or onto the second silicon photodiode 20a.

All of the spectral sensitivities $g_3(\lambda)$ normalized to one of the difference signals as shown in FIGS. 5a to 5e have greater similarity to the likewise shown spectral sensitivity $V(\lambda)$ normalized to one of the human eye in accordance with the standard CIE 018.2-1983 than the spectral sensitivity $g_1(\lambda)$ normalized to one of a silicon photodiode. In particular, the mean square deviation between a spectral sensitivity $g_3(\lambda)$ normalized to one of the difference signal and the spectral sensitivity $V(\lambda)$ normalized to one of the human eye in accordance with CIE 018.2-1983 is less than the mean square deviation between the spectral sensitivity normalized to one of the first detector signal $g_1(\lambda)$ and the spectral sensitivity $V(\lambda)$ normalized to one of the human eye in accordance with CIE 018.2-1983.

Figure 6:
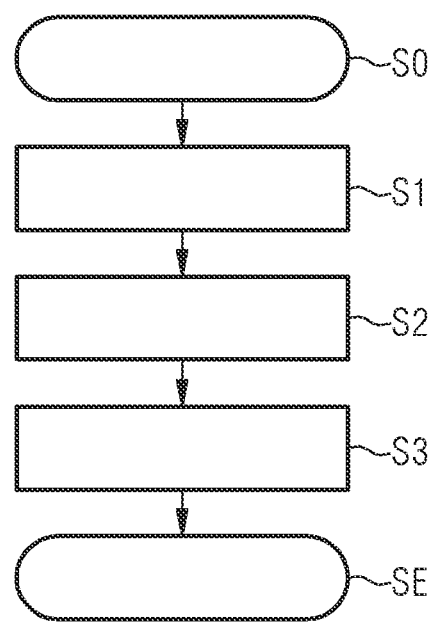
FIG. 6 shows a measuring method.

FIG. 6 illustrates a method for measuring the intensity of the electromagnetic radiation L, which method is suitable for the above-described exemplary embodiments of the optoelectronic measuring device.

The method comprises the step S0: "Start".

The method furthermore comprises step S1: "Detecting the electromagnetic radiation L by means of the first detector 10, 10a". A first detector signal dependent on the intensity of the electromagnetic radiation is provided in this case.

The method furthermore comprises step S2: "Detecting the electromagnetic radiation L by means of the second detector 20, 20a, wherein the electromagnetic radiation L is filtered by means of the spectral filter 24 before detection by the second detector 20". A second detector signal dependent on the intensity of the electromagnetic radiation is provided in this case.

The method furthermore comprises step S3: "Generating the difference signal". In this case, the second detector signal is subtracted from the first detector signal by means of the signal difference determiner 30. Furthermore, in this case, the resulting difference signal can be output via the signal output 31.

The method furthermore comprises step SE: "End".

Figure 7:
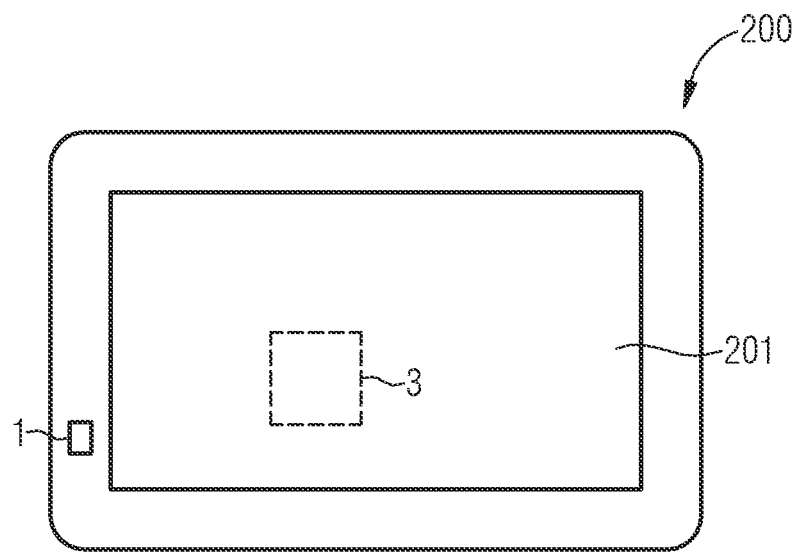
FIG. 7 shows a display device.

As described above, the control unit 3 can be an interface of a personal computer, by means of which e.g. the difference signal is evaluated in a measurement laboratory. Furthermore, the measuring device 1 described above in accordance with the exemplary embodiments described above can also be used in a display device 200, for example. Such a display device 200 is illustrated by way of example in FIG. 7. It comprises a display element 201 in the form of a display and also a measuring device 1 in accordance with one of the exemplary embodiments 1 to 3 described above. The latter is arranged for detecting an ambient brightness. The display device 200 furthermore comprises a control unit 3, which, depending on the difference signal, increases the display brightness of a display element 201 as the ambient brightness increases, such that the display element 201 is very readable in bright surroundings and does not produce glare in dark surroundings. In the present case here the spectral sensitivity of the measuring device 1 is adapted to the sensitivity curve of the human eye by the spectral filter 24.

The display device 200 can be part of a telephone, tablet, of a smartphone or of a motor vehicle 210, for example.

Figure 8:
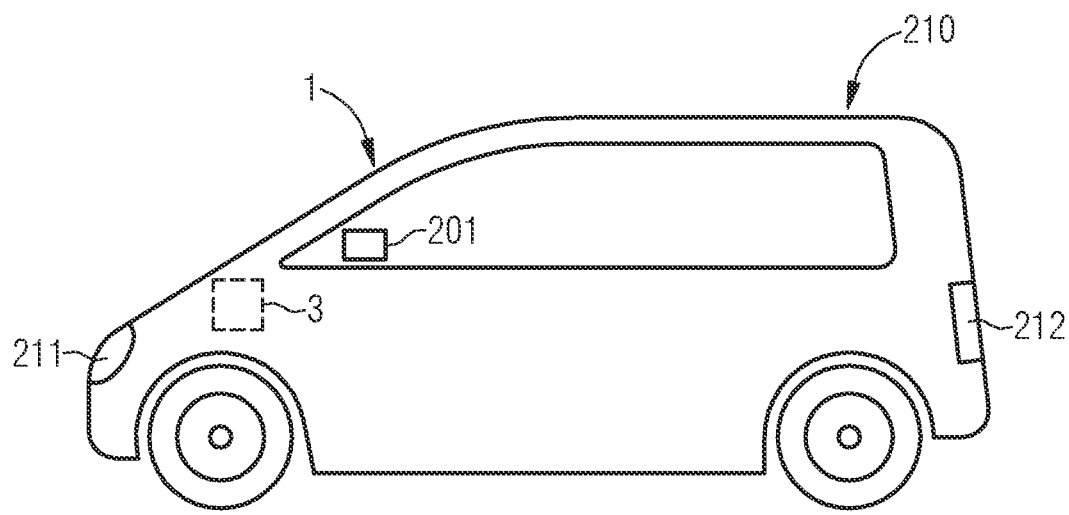
FIG. 8 shows a motor vehicle.

Such a motor vehicle is illustrated in FIG. 8. In this case, the measuring device 1 is arranged in the region of the windshield in order here to detect ambient brightness, in particular the intensity of insolation. The display 201 is arranged such that it is visible to the driver, and the control unit 3 is situated in the engine compartment. In the present case, the control unit is not just configured to control the display brightness as described above in association with FIG. 6. Rather, the headlights 211 and the position luminaires 212 of the motor vehicle 210 are furthermore also controlled depending on the difference signal, such that the headlights 211 and the position luminaires 212 are switched off when there is high ambient brightness and are switched on when there is low ambient brightness.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. An optoelectronic measuring device comprising:
   a first detector configured to provide a first detector signal depending on a first intensity of electromagnetic radiation;
   a second detector configured to provide a second detector signal depending on a second intensity of the electromagnetic radiation;
   a signal difference determiner configured to generate a difference signal by subtracting the second detector signal from the first detector signal, the difference signal reflecting a difference in intensity of the electromagnetic radiation; and
   a spectral filter arranged in a beam path upstream of the second detector,
   wherein the spectral filter is configured to filter the electromagnetic radiation before detection by the second detector,
   wherein the spectral filter is configured so that a mean square deviation between a spectral sensitivity normalized to one of the difference signal for the electromagnetic radiation and a spectral sensitivity normalized to one of a human eye according to Commission Internationale de l'Eclairage (CIE) 18.2-1983 is less than a mean square deviation between a spectral sensitivity normalized to one of the first detector signal or of the second detector signal for the electromagnetic radiation and a spectral sensitivity normalized to one of the human eye according to the CIE 18.2-1983, and
   wherein the optoelectronic measuring device is configured to measure the intensity of the electromagnetic radiation impinging on the optoelectronic measuring device based on the difference in the intensity of the electromagnetic radiation.

2. The optoelectronic measuring device of claim 1, wherein the first detector, at least in a portion of a sensitive spectral range of the first detector, has an identical type of spectral sensitivity in comparison with the second detector.

3. The optoelectronic measuring device of claim 1, wherein the spectral filter is not arranged in a beam path upstream of the first detector so that the spectral filter is not configured to filter the electromagnetic radiation before detection by the first detector.

4. The optoelectronic measuring device of claim 1, wherein the first detector or the second detector comprises a silicon photodiode.

5. The optoelectronic measuring device of claim 1, wherein the spectral filter is intensity attenuating to an extent of at least 50% in a green spectral range.

6. The optoelectronic measuring device of claim 1, wherein the spectral filter comprises a filter material selected from C19H10Cl2N6Na2O7S2, a maleimide, a crystal violet, a cyanine dye, gold nanoparticles, or colloidal quantum dots.

7. The optoelectronic measuring device of claim 1, wherein the spectral filter comprises a spin-coated filter material.

8. The optoelectronic measuring device of claim 1, wherein the first detector and the second detector are arranged relative to one another in such a way that a distance between a detection surface of the first detector and a detection surface of the second detector is less than or equal to 5 mm.

9. The optoelectronic measuring device of claim 1, wherein the first detector and the second detector are arranged relative to one another in such a way that a main detection direction of the first detector and a main detection direction of the second detector are at an angle of at most 30 degrees with respect to one another.

10. The optoelectronic measuring device of claim 1, further comprising an optical radiation distributor configured to distribute the electromagnetic radiation impinging on the optoelectronic measuring device between the first detector and the second detector.

11. A method for measuring the intensity of the electromagnetic radiation, the method comprising:
   measuring, by the optoelectronic measuring device of claim 1, the intensity of the electromagnetic radiation.

12. A display device comprising:
   the optoelectronic measuring device of claim 1, wherein the optoelectronic measuring device is configured to detect an ambient brightness and the display device; and
   a controller configured to control a display brightness of a display element of the display device depending on the difference signal.

13. A motor vehicle comprising:
   the optoelectronic measuring device of claim 1, wherein the optoelectronic measuring device is configured to detect an ambient brightness; and
   a controller configured to control a display brightness of a display element of the motor vehicle depending on the difference signal, or control a headlight or a position luminaire of the motor vehicle depending on the difference signal.

\* \* \* \* \*